United States Patent
Saxena et al.

(10) Patent No.: US 9,953,171 B2
(45) Date of Patent: Apr. 24, 2018

(54) SYSTEM AND METHOD FOR TOKENIZATION OF DATA FOR PRIVACY

(71) Applicant: Infosys Limited, Bangalore (IN)

(72) Inventors: Ashutosh Saxena, Hyderabad (IN); Shikha Gupta, New Delhi (IN); Ina Jain, Jaipur (IN); Harigopal K. B. Ponnapalli, Hyderabad (IN)

(73) Assignee: Infosys Limited, Bangalore (IN)

( * ) Notice: Subject to any disclaimer, the term of this patent is extended or adjusted under 35 U.S.C. 154(b) by 16 days.

(21) Appl. No.: 14/836,723

(22) Filed: Aug. 26, 2015

(65) Prior Publication Data

US 2016/0085971 A1 Mar. 24, 2016

(30) Foreign Application Priority Data

Sep. 22, 2014 (IN) ............................ 4598/CHE/2014

(51) Int. Cl.
*G06N 3/08* (2006.01)
*G06F 21/60* (2013.01)
*G06F 21/62* (2013.01)

(52) U.S. Cl.
CPC ........ *G06F 21/602* (2013.01); *G06F 21/6254* (2013.01)

(58) Field of Classification Search
None
See application file for complete search history.

(56) References Cited

U.S. PATENT DOCUMENTS

| 7,085,759 | B2 | 8/2006 | Kingham et al. |
| 8,346,671 | B2 | 1/2013 | Zloth et al. |
| 2002/0032709 | A1* | 3/2002 | Gessner .................. G06F 17/21 715/271 |
| 2006/0053133 | A1* | 3/2006 | Parkinson ........... G06F 17/2264 |
| 2007/0129938 | A1* | 6/2007 | Wang .................. G06F 17/2818 704/10 |
| 2008/0228467 | A1* | 9/2008 | Womack ............... G06F 17/271 704/9 |
| 2008/0301809 | A1* | 12/2008 | Choi ..................... H04L 12/585 726/23 |
| 2009/0019032 | A1* | 1/2009 | Bundschus ......... G06F 19/3443 |
| 2010/0287196 | A1* | 11/2010 | Shields ............. G06F 17/30781 707/769 |
| 2011/0167255 | A1 | 7/2011 | Matzkel et al. |

(Continued)

OTHER PUBLICATIONS

Steve Bobrowski, "Protecting Your Data in the Cloud", Salesforce Developers. https://developer.salesforce.com/page/Protecting_Your_Data_in_the_Cloud.

(Continued)

*Primary Examiner* — Trang Doan
(74) *Attorney, Agent, or Firm* — Klarquist Sparkman, LLP (57) ABSTRACT

The present invention describes a system and method for tokenization of data. The system includes a receiver configured to receive a request for tokenization. The request for tokenization comprises an input data to be tokenized. The system also includes a parser configured to determine one or more datatype from the input data. The system further includes a trained artificial neural network to generate a token for the input data based on a tokenization technique corresponding to the datatype of the input data.

20 Claims, 5 Drawing Sheets

(56) References Cited

U.S. PATENT DOCUMENTS

| | | | | |
|---|---|---|---|---|
| 2012/0197809 A1* | 8/2012 | Earl | ............ | G06Q 10/103 705/301 |
| 2012/0223889 A1* | 9/2012 | Medlock | ............ | G06F 3/04883 345/168 |
| 2012/0278339 A1* | 11/2012 | Wang | ............ | G06F 17/30241 707/748 |
| 2012/0303559 A1* | 11/2012 | Dolan | ............ | G06N 99/005 706/12 |
| 2013/0132064 A1* | 5/2013 | Hwang | ............ | G06F 17/2818 704/2 |
| 2014/0040144 A1* | 2/2014 | Plomske | ............ | G06Q 20/38215 705/64 |
| 2014/0344153 A1* | 11/2014 | Raj | ............ | G06Q 20/3821 705/44 |
| 2015/0052143 A1* | 2/2015 | Liu | ............ | G06F 17/30705 707/740 |
| 2016/0070917 A1* | 3/2016 | Rozenberg | ............ | H04L 63/0414 726/26 |
| 2016/0094574 A1* | 3/2016 | Hsueh | ............ | G06N 7/005 726/23 |
| 2016/0156646 A1* | 6/2016 | Hsueh | ............ | G06F 21/563 726/1 |
| 2016/0299955 A1* | 10/2016 | Jain | ............ | G06F 17/30716 |

OTHER PUBLICATIONS

Data Security and Privacy—Voltage SecureData™, Infromatica Marketplace. https://community.informatica.com/solutions/data_security_and_privacy.

* cited by examiner

| INPUT DATA 310 | INFORMATION CONTAINED IN INPUT DATA 320 | DATA TYPE 330 |
|---|---|---|
| Account Transaction | Date, Transaction Details, Category, Amount | D, An, A, N |
| Bank Records | Date, Ref No, Type, Details, Debit, Credit, Balance | D, N, A, An, N, N, N |
| Patient record | Patient Name, Age, Gender, Illness, Medicine | A, N, A, A, A |
| Legal records | Case Number, Filling Date, Suit Filed Amount, Petitioner, Respondent, Court, Lawyer, Stage, Nature | An, D, N, A, A, A, A, A, A |
| Educational records | Enrollment Number, Student Name, DOB, Class Name, Gender, Phone Number | N, A, D, An, A, N |
| Employee Details | First Name, Last Name, Address, DOB, Gender, Salary, DOJ, Band Level | A, A, An, D, A, N, D, A |
| Motor License | License State, Last Name, First Name, Address, SSN, Activation Date, Expiry Date | A, A, A, An, N, D, D |
| Card Details | Name, Card Type, Card Number, Security Code, Expiration Year, Expiration Month | A, A, N, N, N, N |

SYSTEM AND METHOD FOR TOKENIZATION OF DATA FOR PRIVACY

This application claims priority to India Patent Application No. 4598/CHE/2014, filed Sep. 22, 2014, the disclosure of which is hereby incorporated by reference in its entirety.

BACKGROUND

The invention generally relates to data privacy, and more particularly, to a method and system for tokenization of data for privacy.

Generally, data privacy has been a major concern in the scenarios where in data storage and data transmissions are involved. Confidential data such as medical details, etc. are under potential risks and require proper measures for preventing data leakage. For example, an application may be associated with databases consisting of name, address, social security number, and other personal data. This data may be required by a third party application for a genuine purpose. But the third party application environment may not have the safeguards in place to adequately protect the sensitive data. Such scenarios demand that there exist some mechanisms for data privacy.

Currently, many approaches, schemes and compliances have been in use for enforcing data privacy. Tokenization is one such approach which is widely used in data privacy mechanism. It prevents data leakage by substituting the original sensitive data with a non-trivial data token. It is prevalent in Payment Card Industry due to security reasons standards do not allow the vendors' to keep a record of customers' credit card number and other details in the vendors' database.

However, the existing tokenization systems are not sufficiently flexible. They provide very limited range of mechanisms to pursue tokenization leading to less usage options. This leads to dissatisfied users as the user preferred configuration might not be feasible in several cases. Also, in order to increase the scope of tokenization, extensive data types must be supported in the system.

Hence, there is a need of a method and system for tokenization of data for privacy to satisfy varied user requirements, by providing a full-fledged flexible and wide spectrum tokenization system to protect sensitive data from leakage with wide variety of configurable options and settings.

SUMMARY

An object is to provide a system and method for tokenization of data for privacy. This provides an automated system which will facilitate in tokenization of sensitive data by using an intelligent trained artificial neural network which will generate a token corresponding to the tokenization as per the requirements of the user.

In one of the aspect a system for tokenization of data is provided. The system for tokenization of data comprising a receiver configured to receive a request for tokenization wherein the request comprises an input data to be tokenized; a parser configured to determine one or more datatype from the input data; a trained artificial neural network to generate a token for the input data based on a tokenization technique corresponding to the datatype of the input data.

In another aspect a computer implemented method for tokenization of data, the method comprising the steps of receiving by the receiver a request for tokenization, wherein the request comprises an input data to be tokenized; parsing by the parser for determining one or more datatype from the input data; generating by the trained artificial neural network, a token for the input data based on a tokenization technique corresponding to the datatype of the input data.

As described herein, a variety of other features and advantages can be into the technologies as desired.

The foregoing and other features and advantages will become more apparent to one skilled in the art from the following detailed description of disclosed embodiments, which proceeds with reference to the accompanying drawings.

BRIEF DESCRIPTION OF DRAWINGS

The accompanying drawings, which constitute a part of this disclosure, illustrate various embodiments and aspects of present invention and together with the description, explain the principle of the invention.

DETAILED DESCRIPTION

The technologies described herein can be used for tokenization of data. Adoption of the technologies can provide an efficient technique to enforce privacy of sensitive data.

The technologies are targeted to significantly protect the sensitive data containing personal information. Tokenization system described herein enforces anonymity and data privacy by converting sensitive input data into non-trivial form termed as token using various tokenization schemes. The system provides high level of flexibility accommodating varied kinds of user requirements.

The system supports a wide range of input data from a variety of data sources. For instance, the input to tokenization system may comprise of card numbers, stocks related information, medical records, vehicle registration information, driving license number, social security numbers, visa/passport details, etc. The system can also be extended to accommodate any additional types of data as per user utility and business requirements.

The system is accommodative in terms of tokenization schemes that can be used to generate the tokens. The algorithms may range from encryption, hashing, randomization etc. to any secure transformation algorithm. A secure tokenization scheme is one that does not allow the generated token to be converted back to the original data without a system input such as a key, password etc. The token structure depends upon the tokenization scheme selected by the user.

The system offers varied accessibility mediums to facilitate tokenization. The developers can directly integrate the tokenization API's in their application to utilize the tokenization utility. The system can be easily tailored to work within the particularities of an application. Apart from these to support multiple organizations it can also be used as a service on cloud, still retaining configurable user requirements and settings. Moreover, it can further be customized to fulfill the varied business needs in diverse business scenarios.

Data vault of the tokenization system manages the records of the tokens generated by the system. It keeps track of the tokenization scheme that is used to generate the token and also records the information required to de-tokenize the token.

Figure 1:
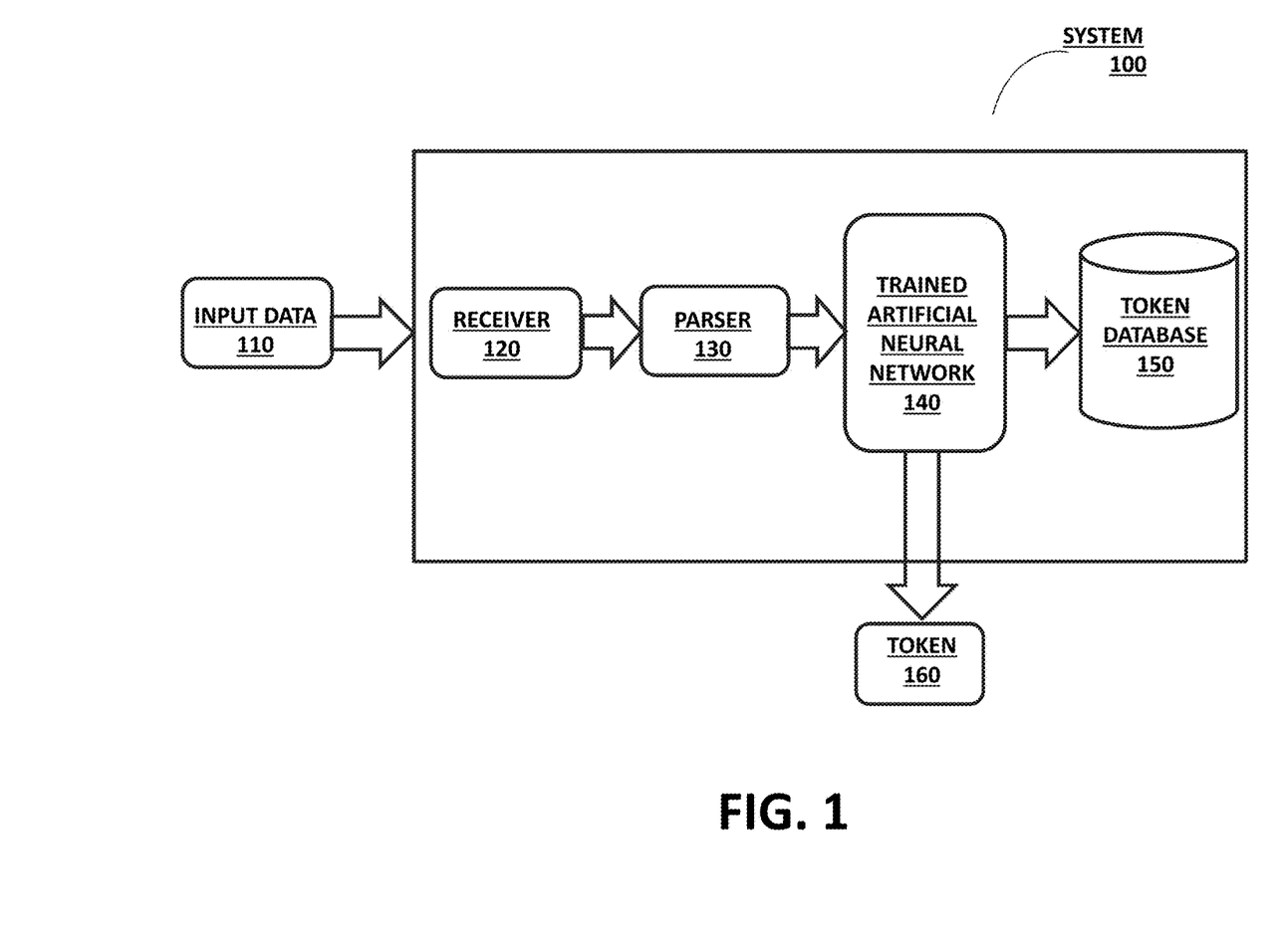
FIG. 1 is a diagrammatic representation of an exemplary system for tokenization of data described herein.

FIG. 1 is a block diagram of an exemplary system 100 for implementing the tokenization of data described herein. In the example, one or more computers in a computing environment implement system 100 that accepts input data as an input for the tokenization of the input data. The input data 110 may include data from a medical application, etc. The input data may include a sequence of characters known as string. A string may be a sequence of numeric or alphanumeric characters or combination of both. The system 100 includes a receiver 120 configured to receive a request for tokenization. The request for tokenization of data includes an input data 110 to be tokenized. The tokenization of data may be requested by a user or by an application which requires generation of a token corresponding to the input data for data security purposes. The system 100 further includes a parser 130 configured to determine one or more datatype from the input data. The parser receives the input data 110 as a sequence of characters and breaks them into parts for determining the datatype of the input data. The datatype may include a data structure based on type of the input data. The system 100 may be initially configured manually by a user with various datatypes known to him based on historical datatypes, standards etc. The user may further configure the system 100 with a tokenization technique corresponding to the datatype of the input data for tokenization. The parser after determining the datatype of the input data compares it with the datatypes configured by the user and determines a tokenization technique which would be used for generation of a token. The system 100 then processes the input data 110 by a trained artificial neural network 140 to generate a token 160 for the input data 110 based on a tokenization technique corresponding to the datatype of the input data. The generated token 160 can be stored in a token database 150 configured to store the token. The trained artificial neural network is trained using a predefined set of data. The tokenization techniques comprises at least one from hashing, encrypting, random numbers or combinations of them.

In practice, the systems shown herein, such as system 100 can be more complicated, comprising additional functionality, more complex inputs, and the like.

In any of the examples herein, the inputs and outputs can be stored in one or more computer-readable storage media or memory.

Figure 2:
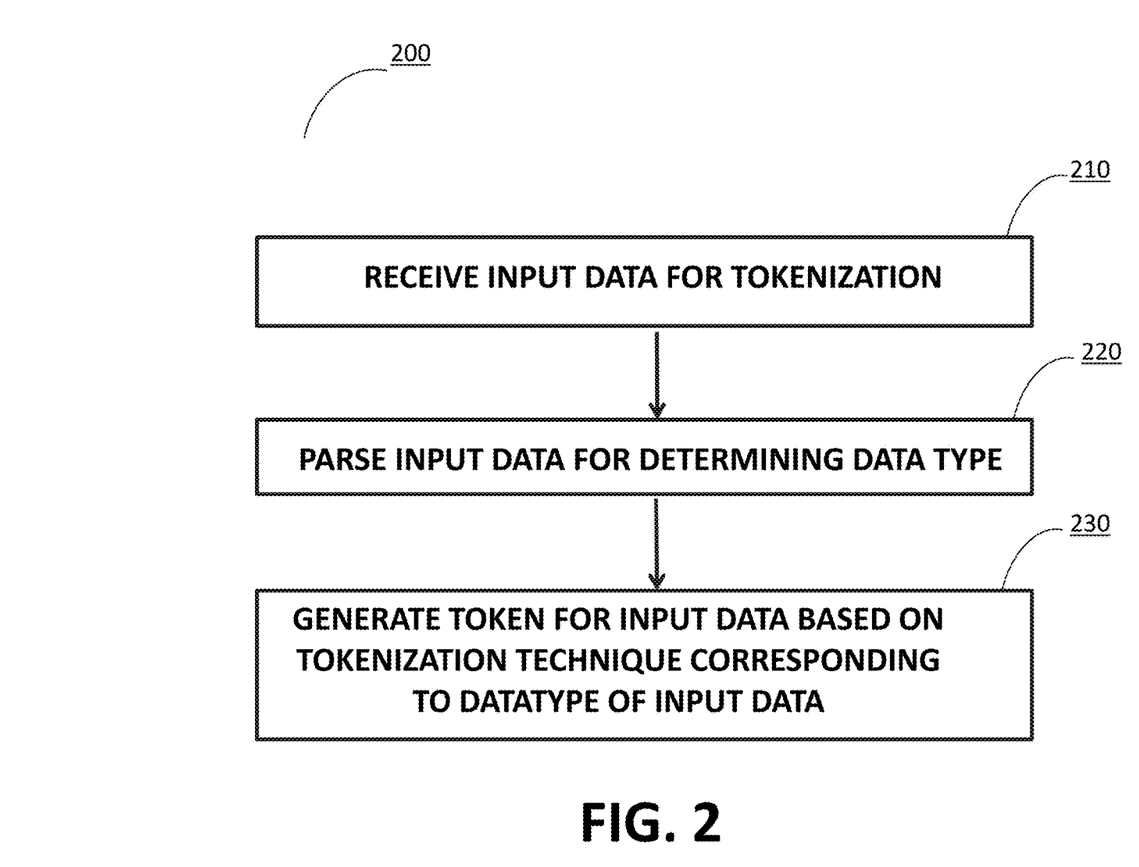
FIG. 2 is a flowchart representing steps involved in an exemplary method for tokenization of data described herein.

FIG. 2 is a flowchart of an exemplary method 200 of implementing the monitoring of health of a virtual environment as described herein and can be implemented for example in a system such as shown in FIG. 2. The technologies described herein can be generic to the specifics of operating systems or hardware and can be applied in any variety of environments to take advantage of the described features.

At 210, a request for tokenization of data is received. The request for tokenization may include the data to be tokenized. The data to be tokenized may be any data, such as medical data, etc.

At 220, for the data obtained at step 210, a datatype from the input data is determined. A user may initially configure system 100 manually with various datatypes known to him based on historical datatypes, standards etc. The user may further configure the system 100 with a tokenization technique corresponding to the datatype of the input data for tokenization. The parser after determining the datatype of the input data compares it with the datatypes configured by the user and determines a tokenization technique which would be used for generation of a token. The datatype is determined by a parser by analyzing the input data and comparing it with stored datatypes to find a match. The parser is capable to be configured to store predefined datatypes. The datatype comprises a data structure based on type of the input data.

At 230, for each datatype determined at step 210, a token for the input data is generated based on a tokenization technique corresponding to the datatype of the input data by a trained artificial neural network. The trained artificial neural network 140 is trained using a predefined set of data. The generated token 160 may be stored in a token database 150 of the tokenization system 100.

The method 200 and any of the methods described herein can be performed by computer-executable instructions stored in one or more computer-readable media (storage, memory or other tangible media) or stored in one or more compute readable storage devices.

In any of the examples herein, the tokenization system supports a wide range of input data from a variety of data sources having different datatypes. For instance, the input to tokenization system may comprise of credit card numbers, pan card numbers, debit card numbers, stocks related information, medical records, vehicle registration information, driving license number, zip codes, and many other types of sensitive data.

The system may also be extended to accommodate any additional types of data as per utility of the user and business requirements.

EXAMPLE 5

Exemplary Data Type

Figure 3:
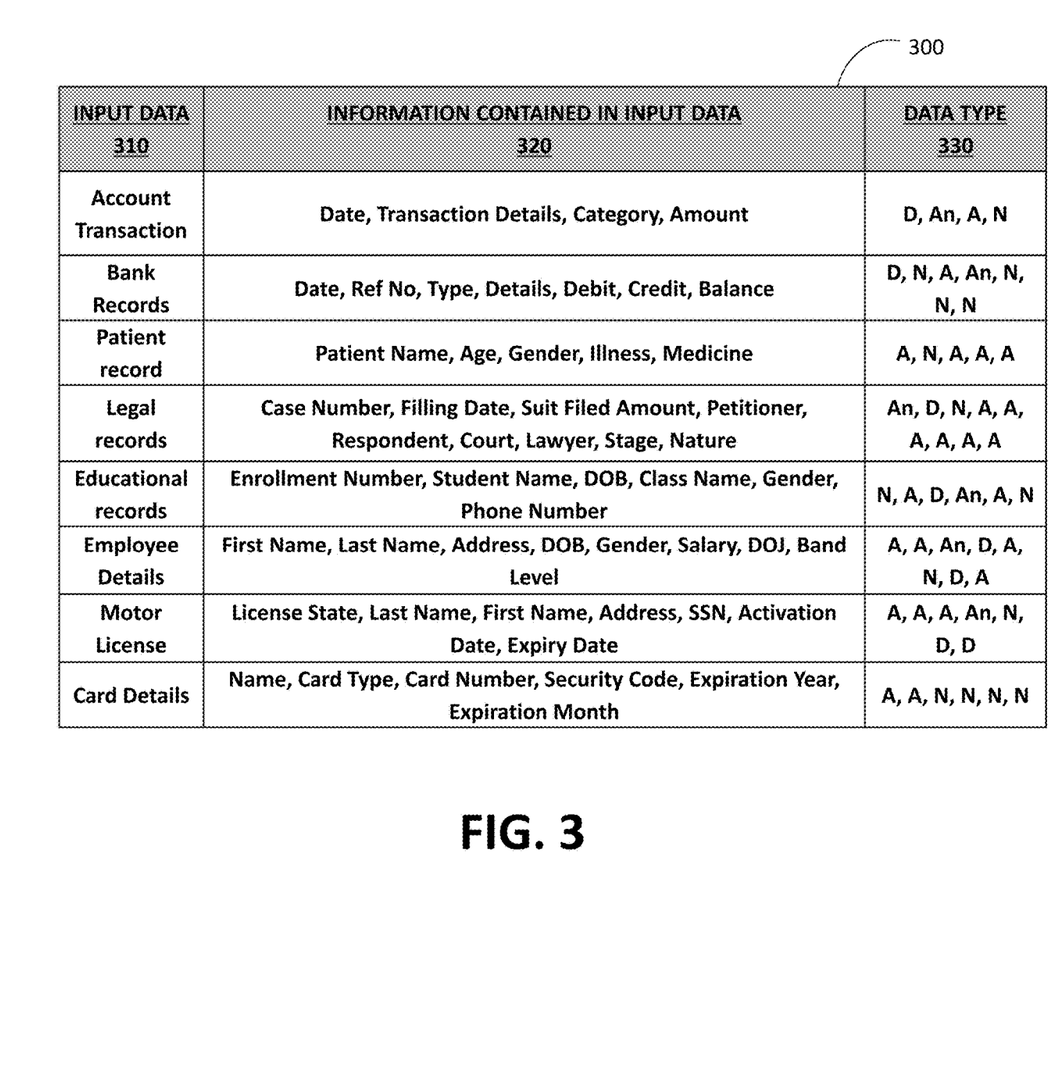
FIG. 3 is a table of input data, information and datatypes suitable for implementing any of the technologies described herein.

In any of the examples herein, a data type may include a data structure based on type of the input data. Example of datatype corresponding to various input data and the information contained in the input data is shown in FIG. 3. Table 300 describes exemplary input data 310, information 320 related to input data 310 and the corresponding datatype 330 where "N" represents a number, "A" represents words, "D" represents date and "An" represents alphanumeric entity in the datatype 330. A user may initially configure system 100 manually with various datatypes known to him based on historical datatypes, standards etc. In an exemplary embodiment, the input data may include account information. The information corresponding to the account data may include "Date, Transaction Details, Category and Amount". In the exemplary embodiment, the datatype for account information as input data may be set by user as D, An, A, N where "N" represents a number, "A" represents words, "D" represents date and "An" represents alphanumeric entity. In another embodiment, the input data may include legal information. The information corresponding to the legal data may include "Case Number, Filling Date, Suit Filed Amount, Petitioner, Respondent, Court, Lawyer, Stage, and Nature". In the exemplary datatype for as input data may be set by user as An, D, N, A, A, A, A, A, A where "An" represents alphanumeric entity, "D" represents the date "N" represents a number, and "A" represents words. In yet another embodiment, the input data may include patient record. The information corresponding to the patient record may include "Patient Name, Age, Gender, Illness, and Medicine". In the exemplary datatype for as input data may be set by user as A, N, A, A, A where "A" represents words, and "N" represents a number.

EXAMPLE 6

Exemplary Trained Artificial Neural Network and Training Method

Artificial neural networks are simple electronic models based on the neural structure of the brain that basically learns from experience. An artificial neural network consists of some basic elements called neurons. Each neuron includes a set of inputs, weight coefficients (called synaptic weights), and an activation function. Neurons form the layers coming together called input layer, an output layer, and some optional intermediate layer(s), hidden layers. The input layer is made up of the sensory units that collect the information from its environment or being supplied by us explicitly. The hidden layers apply a transformation from the input space to the output space. To obtain the desired output for any given input, the coefficients should be determined by training the network where sets of inputs with the corresponding outputs are given to the network through a training algorithm. This process should be repeated several times in order to minimize the output error. Each run of a complete set is called an epoch. Multilayer perceptron have been applied successfully to difficult problems by training in a supervised algorithm known as the error back propagation algorithm.

The artificial neural network is trained by using a training set of input data and output data to obtain a trained artificial neural network. The training of artificial neural network concludes once the error is minimum or the output set of the artificial neural network corresponds to the desired output set with respect to the training input data set. The trained artificial neural network may be used in the tokenization system for generating tokens.

Figure 4:
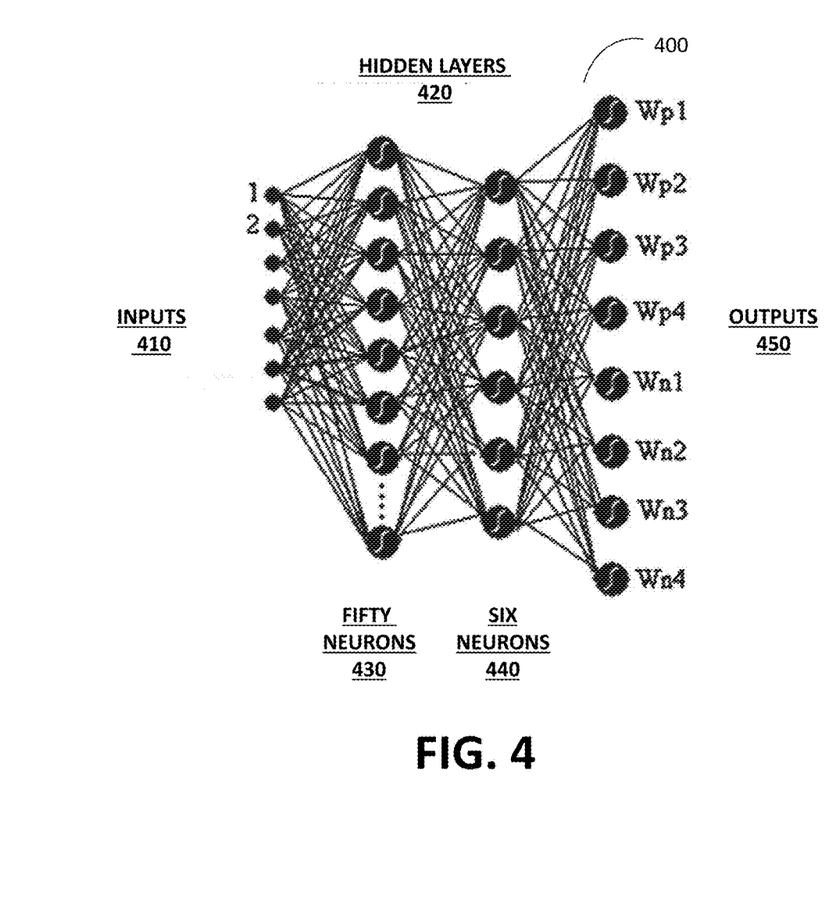
FIG. 4 is a block diagram of an exemplary artificial neural network for implementing any of the technologies described herein.

In any of the examples herein, FIG. 4 shows a simple Multilayer perceptron architecture 400, where the inputs 410 and the outputs 450 of the artificial neural network are also shown. This learning algorithm consists of two directions through the different layers of the network: forward and backward directions. The Multilayer perceptron architecture 400 includes two exemplary hidden layers 420 including 50 neurons 430 and 6 neurons 440 respectively. In the forward direction, an input data is applied to the input nodes of the network, and its error propagates through the network layer by layer. Finally, a set of outputs is produced as an actual response of the network. During the forward direction, the synaptic weights of the networks are not changed while, during the backward direction, the synaptic weights are altered in accordance with an error correction rule. The definite response of the output layer is subtracted absolutely from an expected response to produce an error signal. This error signal is then propagated backward through the network.

Every processing node has connections to all forward and backward neurons. The connections carry weights which encapsulate the behavior of the network and are adjusted during training. The operation of the network consists of two stages: the forward direction and the backward direction. In the forward direction, an input pattern vector is presented to the network and the output of the input layer nodes is precisely the components of the input pattern. For successive layers the input to each node is then the sum of the scalar products of the incoming vector components with their respective weights.

That is the input to a node j is given by equation (1) where $W_{ji}$ is the weight connecting node i to node j and out is the output from node i.

$$\text{input}_j = \Sigma w_{ji} \text{out}_j \quad \text{equation (1)}$$

The output of a node j is given by Eq. (2) which is then sent to all nodes in the following layer.

$$\text{out}_j = f(\text{input}_j) \quad \text{equation (2)}$$

This continues through all the layers of the network until the output layer is reached and the output vector is computed. The input layer nodes do not perform any of the above calculations. They simply take the corresponding value from the input pattern vector. The function $f$ denotes the activation function of each node. A sigmoid activation function given by equation (3) is frequently used, $$f(x) = 1/\{1 + \exp(-x)\} \quad \text{equation (3)}$$

Where $x = \text{input}_j$. This ensures that the node acts like a threshold device.

Multilayer feed-forward artificial neural network is trained by supervised learning using the iterative back-propagation algorithm. In the learning phase a set of input patterns, called the training set, are presented at the input layer as feature vectors, together with their corresponding desired output pattern which usually represents the classification for the input pattern. Beginning with small random weights, for each input pattern the network is required to adjust the weights attached to the connections so that the difference between the network's output and the desired output for that input pattern is decreased. Based on this difference the error terms or $\delta$ terms for each node in the output layer are computed. The weights between the output layer and the layer below (hidden layer) are then adjusted by the generalized delta rule given by equation (4)

$$w_{kj}(t+1) = w_{kj}(t) + \eta^*(\delta_k \text{out}_k) \quad \text{equation (4)}$$

where $w_{kj}(t+1)$ and $w_{kj}(t)$ are the weights connecting nodes k and j at iteration (t+1) and t respectively, $\eta$ is a learning rate parameter. Then the $\delta$ terms for the hidden layer nodes are calculated and the weights connecting the hidden layer with the layer below (another hidden layer or the input layer) are updated. This procedure is repeated until the last layer of weights has been adjusted.

The $\delta$ term in equation (4) is the rate of change of error with respect to the input to node k, and is given by equation (5) for nodes in the output layer, and equation (6) for nodes in the hidden layers, where $d_k$ is the desired output for a node k.

$$\delta_k = (d_k - \text{out}_k) f'(\text{input}_k) \quad \text{equation (5)}$$

$$\delta_j = f'(\text{input}_k) \Sigma_k \delta_k w_{kj} \quad \text{equation (6)}$$

The back-propagation algorithm is a gradient descent optimization procedure which minimizes the mean square error between the networks output and the desired output for all input patterns P, $$E = \left(\frac{1}{2P}\right) \Sigma_p \Sigma_k (d_k - \text{out}_k)^2 \quad \text{equation (7)}$$

The training set is presented iteratively to the network until a stable set of weights is achieved and the error function is reduced to an acceptable level. To measure the generalization ability of the multilayer feed-forward artificial neural network it is common to have a set of data to train the network and a separate set to assess the performance of the network during or after the training is complete. The trained artificial neural network may now be ready for use in the tokenization system for generating tokens.

There may be a possibility to use other models of artificial neural network for implementing this invention without any major enhancements. It should be recognized that the illustrated embodiment of two layered artificial neural network is one of the example of the disclosed technology and should not be taken as a limitation on the scope of the disclosed technology. More complex artificial neural networks may be trained and can be used for implementing the invention.

In any of the examples herein, the tokenization system is accommodative in terms of tokenization techniques that can be used to generate the tokens. The techniques may range from any one or combination of encryption, hashing, randomization etc. to any secure transformation algorithm. A secure tokenization technique is one that does not allow the generated token to be converted back to the original data without a system input such as a key, password etc. Moreover, based on the user requirements the tokenization system is even capable of generating data tokens that preserves the input data format. Also, the tokenization technique is strong enough that it is not feasible for someone to guess the token to be for a given data, in spite of having huge collection of data and token pairs. The token structure depends upon the tokenization scheme determined by the tokenization system 100. The user may further configure the system 100 with a tokenization technique corresponding to the datatype of the input data for tokenization.

The general process for tokenization of data is processing the input data to determine a datatype and generate a token for the input data corresponding to the determined datatype by a trained artificial neural network.

In one embodiment, a request for tokenization of data is received. The request for tokenization may include the data to be tokenized. The data to be tokenized may be any sensitive data such as medical data, etc. For the input data obtained, a datatype from the input data is determined. The datatype is determined by a parser by analyzing the input data and comparing it with stored datatypes to find a match. The parser is capable to be configured to store predefined datatypes. The datatype comprises a data structure based on type of the input data. A token for the input data is generated based on a tokenization technique corresponding to the datatype of the input data by a trained artificial neural network. The trained artificial neural network is trained using a predefined set of data. The generated token may be stored in a token database.

In one of the embodiment, an exemplary credit card number (8111-1111-1111-4444) is requested to be tokenized by the system. The received credit card number is parsed by the system to determine the datatype corresponding to the credit card number. The data structure of the credit card number is compared to the available data structures in the system to identify a matching data type. The input credit card number along with the datatype information is provided as an input to the trained artificial neural network. On application of this input the trained artificial neural network generates a token for the credit card number corresponding to the datatype based on a tokenization technique for which the neural network has been trained. The generated token may be (1832-5876-9143-1002) for exemplary purposes. The generated token may be communicated to the requesting party. A copy of the generated token may also be saved in the token database for further use.

The techniques and solutions described herein can be performed by software, hardware, or both of a computing environment, such as one or more computing devices. For example, computing devices include server computers, desktop computers, laptop computers, notebook computers, handheld devices, netbooks, tablet devices, mobile devices, PDAs, and other types of computing devices.

Figure 5:
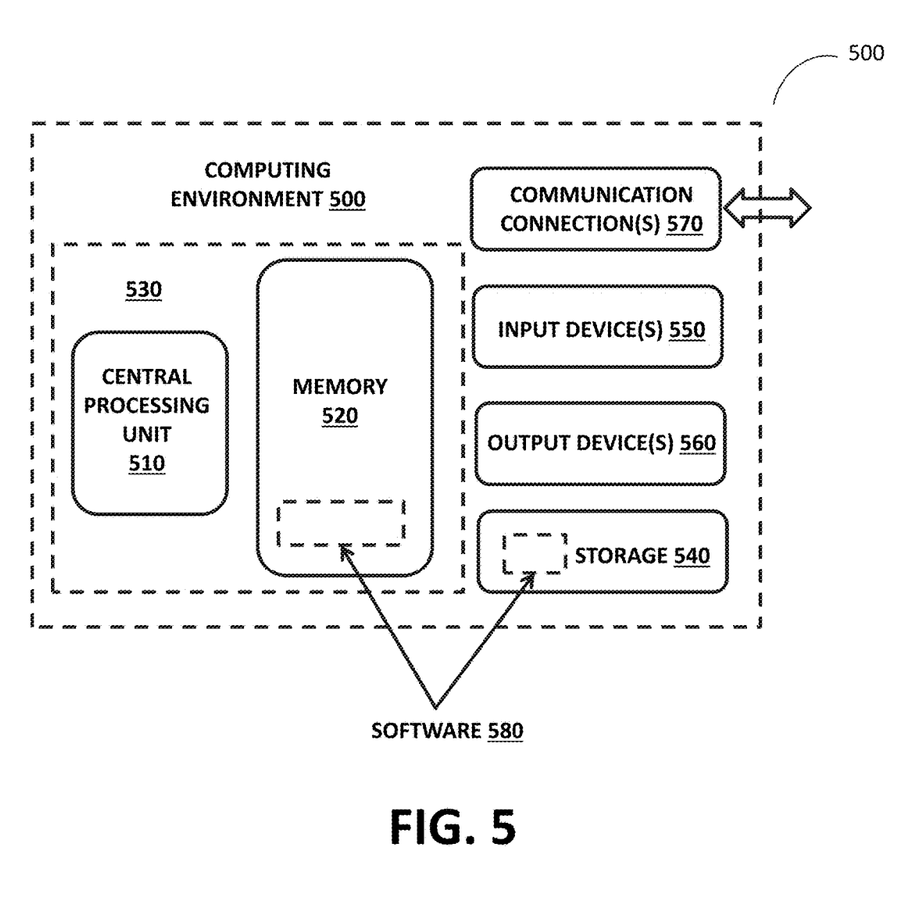
FIG. 5 is a block diagram of an exemplary computing environment suitable for implementing any of the technologies described herein.

FIG. 5 illustrates a generalized example of a suitable computing environment 500 in which the described technologies can be implemented. The computing environment 500 is not intended to suggest any limitation as to scope of use or functionality, as the technologies may be implemented in diverse general-purpose or special-purpose computing environments. For example, the disclosed technology may be implemented using a computing device comprising a processing unit, memory, and storage storing computer-executable instructions implementing the enterprise computing platform technologies described herein. The disclosed technology may also be implemented with other computer system configurations, including hand held devices, multiprocessor systems, microprocessor-based or programmable consumer electronics, network PCs, minicomputers, mainframe computers, a collection of client/server systems, and the like. The disclosed technology may also be practiced in distributed computing environments where tasks are performed by remote processing devices that are linked through a communications network. In a distributed computing environment, program modules may be located in both local and remote memory storage devices With reference to FIG. 5, the computing environment 500 includes at least one processing unit 510 coupled to memory 520. In FIG. 3, this basic configuration 530 is included within a dashed line. The processing unit 510 executes computer-executable instructions and may be a real or a virtual processor. In a multi-processing system, multiple processing units execute computer-executable instructions to increase processing power. The memory 520 may be volatile memory (e.g., registers, cache, RAM), non-volatile memory (e.g., ROM, EEPROM, flash memory, etc.), or some combination of the two. The memory 520 can store software 580 implementing any of the technologies described herein.

A computing environment may have additional features. For example, the computing environment 500 includes storage 540, one or more input devices 550, one or more output devices 560, and one or more communication connections 570. An interconnection mechanism (not shown) such as a bus, controller, or network interconnects the components of the computing environment 500. Typically, operating system software (not shown) provides an operating environment for other software executing in the computing environment 500, and coordinates activities of the components of the computing environment 500.

The storage 540 may be removable or non-removable, and includes magnetic disks, magnetic tapes or cassettes, CD-ROMs, CD-RWs, DVDs, or any other computer-readable media which can be used to store information and which can be accessed within the computing environment 500. The storage 540 can store software 580 containing instructions for any of the technologies described herein.

The input device(s) 550 may be a touch input device such as a keyboard, mouse, pen, or trackball, a voice input device, a scanning device, or another device that provides input to the computing environment 500. For audio, the input device(s) 550 may be a sound card or similar device that accepts audio input in analog or digital form, or a CD-ROM reader that provides audio samples to the computing environment. The output device(s) 560 may be a display, printer, speaker, CD-writer, or another device that provides output from the computing environment 500.

The communication connection(s) 570 enable communication over a communication mechanism to another computing entity. The communication mechanism conveys information such as computer-executable instructions, audio/video or other information, or other data. By way of example, and not limitation, communication mechanisms include wired or wireless techniques implemented with an electrical, optical, RF, infrared, acoustic, or other carrier.

The techniques herein can be described in the general context of computer-executable instructions, such as those included in program modules, being executed in a computing environment on a target real or virtual processor. Generally, program modules include routines, programs, libraries, objects, classes, components, data structures, etc., that perform particular tasks or implement particular abstract data types. The functionality of the program modules may be combined or split between program modules as desired in various embodiments. Computer-executable instructions for program modules may be executed within a local or distributed computing environment.

Any of the storing actions described herein can be implemented by storing in one or more computer-readable media (e.g., computer-readable storage media or other tangible media).

Any of the things described as stored can be stored in one or more computer-readable media (e.g., computer-readable storage media or other tangible media).

Any of the methods described herein can be implemented by non transient computer-executable instructions in (e.g., encoded on) one or more computer-readable media (e.g., computer-readable storage media or other tangible media). Such instructions can cause a computer to perform the method. The technologies described herein can be implemented in a variety of programming languages.

Any of the methods described herein can be implemented by computer-executable instructions stored in one or more computer-readable storage devices (e.g., memory, magnetic storage, optical storage, or the like). Such instructions can cause a computer to perform the method.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the following claims. We therefore claim as our invention all that comes within the scope and spirit of the claims.

What is claimed is:

1. A system for tokenization of data comprising:
   a receiver configured to receive a request for tokenization, wherein the request comprises input data to be tokenized;
   a parser configured to parse the input data into a plurality of input data parts and determine respective datatypes corresponding to the input data parts;
   a trained artificial neural network comprising a plurality of artificial neurons comprising respective inputs, weight coefficients, and activation functions, the plurality of artificial neurons forming an input layer, an output layer, and one or more hidden layers, wherein the input layer receives the plurality of input data parts and the respective datatypes, the one or more hidden layers apply a transformation to the plurality of input data parts to generate tokens via a plurality of different tokenization techniques corresponding to the respective datatypes of the plurality of input data parts, and the output layer provides at least one output token corresponding to a given input data part out of the plurality of input data parts.

2. The system of claim 1, further comprising a token database configured to store the at least one output token.

3. The system of claim 1, wherein the datatype of the given input data part comprises a data structure based on type of the input data.

4. The system of claim 1, wherein the trained artificial neural network is trained using a predefined set of data.

5. The system of claim 1, wherein the secure tokenization technique comprises at least one selected from the group consisting of:
   hashing, encrypting, random numbers, and combinations of hashing, encrypting, or random numbers.

6. A computer implemented method for tokenization of data, the method comprising the steps of:
   receiving a request for tokenization, wherein the request comprises input data to be tokenized;
   parsing the input data into a plurality of input data parts and determining respective datatypes corresponding to the input data parts;
   generating, by a trained artificial neural network executing on one or more computing devices and configured to generate tokens via a plurality of different tokenization techniques, at least one output token corresponding to a given input data part out of the plurality of input data parts via a secure tokenization technique corresponding to the datatype of the given input data part, wherein the trained artificial neural network comprises a feed-forward neural network having a forward direction and a backward direction, and comprising an input layer, an output layer, and one or more hidden layers that apply a transformation to the plurality of input data parts and respective datatypes to generate the tokens via the plurality of different tokenization techniques;
   receiving a system input; and
   converting the at least one output token back to the given input data part with the system input, wherein the secure tokenization technique does not allow the at least one output token to be converted back to the given input data part without the system input.

7. The method of claim 6, further comprising storing the at least one output token in a token database.

8. The method of claim 6, wherein the datatype of the given input data part comprises a data structure based on type of the input data.

9. The method of claim 6, wherein the trained artificial neural network is trained using a predefined set of data.

10. The method of claim 6, wherein the secure tokenization technique comprises at least one selected from the group consisting of:
    hashing, encrypting, random numbers, and combinations of hashing, encrypting, or random numbers.

11. At least one non-transitory computer-readable medium storing computer-readable instructions that, when executed by one or more computing devices, cause at least one of the one or more computing devices to:
    receive, a request for tokenization, wherein the request comprises input data to be tokenized;

parse the input data into a plurality of input data parts;
determine respective datatypes of the input data parts; and
generate, by a trained artificial neural network comprising a multilayer perceptron architecture configured to apply a transformation to the plurality of input data parts and respective datatypes to generate tokens via a plurality of different tokenization techniques, at least one output token representing a given input data part out of the plurality of the input data parts via a secure tokenization technique of the plurality of different tokenization techniques, the secure tokenization technique corresponding to the datatype of the given input data part, and the at least one output token preserves format of the given input data part.

12. The at least one non-transitory computer-readable medium of claim 11, further comprising storing the at least one output token in a token database.

13. The at least one non-transitory computer-readable medium of claim 11, wherein the datatype of the given input data part comprises a data structure based on type of the input data.

14. The at least one non-transitory computer-readable medium of claim 11, wherein the trained artificial neural network is trained using a predefined set of data.

15. The at least one non-transitory computer-readable medium of claim 11, wherein the secure tokenization technique comprises at least one selected from the group consisting of:
hashing, encrypting, and random numbers.

16. The method of claim 6 further comprising:
configuring a correspondence between a specified secure tokenization technique and a specified data type; and
applying the specified secure tokenization technique when generating the at least one output token based on the correspondence with the specified data type.

17. The method of claim 6 wherein:
a plurality of given input data parts are of different data types comprising dates and numbers; and corresponding output tokens preserve formats of the given input data parts.

18. The method of claim 1 wherein:
outputs of artificial neurons of the input layer and the one or more hidden layers of the trained artificial neural network form inputs for artificial neurons of a subsequent hidden layer or output layer of the trained artificial neural network.

19. The method of claim 1 wherein:
outputs of the input layer artificial neurons comprise components of the input data parts; and
outputs of the respective artificial neurons of the one or more hidden layers comprise the sum of the scalar products of incoming components with the respective weight coefficients of the respective artificial neurons.

20. The method of claim 1 wherein:
at least one of the activation functions comprises a sigmoid activation function.

* * * * *